United States Patent
Zhong et al.

(10) Patent No.: US 11,508,955 B2
(45) Date of Patent: Nov. 22, 2022

(54) CONDUCTIVE CARBON MATERIAL DISPERSING AGENT AND HIGH-CONDUCTIVITY SLURRY FOR LITHIUM BATTERY

(71) Applicant: Jiangsu Cnano Technology Co., Ltd., Jiangsu (CN)

(72) Inventors: Guoxing Zhong, Jiangsu (CN); Ou Mao, Jiangsu (CN); Meijie Zhang, Jiangsu (CN); Tao Zheng, Jiangsu (CN)

(73) Assignee: JIANGSU CNANO TECHNOLOGY CO., LTD., Jiangsu (CN)

( * ) Notice: Subject to any disclaimer, the term of this patent is extended or adjusted under 35 U.S.C. 154(b) by 279 days.

(21) Appl. No.: 16/568,277

(22) Filed: Sep. 12, 2019

(65) Prior Publication Data

US 2020/0106090 A1    Apr. 2, 2020

Related U.S. Application Data (60) Provisional application No. 62/737,934, filed on Sep. 28, 2018.

(51) Int. Cl.
*H01M 4/1393* (2010.01)
*H01M 10/0525* (2010.01)
(Continued)

(52) U.S. Cl.
CPC ......... *H01M 4/1393* (2013.01); *H01M 4/045* (2013.01); *H01M 4/133* (2013.01); *H01M 10/0525* (2013.01)

(58) Field of Classification Search
CPC .... H01M 4/045; H01M 4/133; H01M 4/1393; H01M 4/625; H01M 10/052; H01M 10/0525; Y02E 60/10
See application file for complete search history.

(56) References Cited

U.S. PATENT DOCUMENTS

| 2013/0017374 A1* | 1/2013 | Mionic | C09D 163/00 |
| | | | 428/195.1 |
| 2014/0120339 A1* | 5/2014 | Nikova | B01J 20/3078 |
| | | | 428/312.2 |

(Continued)

FOREIGN PATENT DOCUMENTS

| CN | 104736643 A | 6/2015 |
| CN | 107579208 A | 1/2018 |

OTHER PUBLICATIONS

Zhenggen Yang et al., The Mechanism of PVA-activated Modification of Maleic Anhydride Copolymers, Journal of Beijing University of Chemical Technology (Natural Science), 2009, pp. 72-76, vol. 36, No. 6.

(Continued)

*Primary Examiner* — Brittany L Raymond
(74) *Attorney, Agent, or Firm* — Cooper Legal Group, LLC (57) ABSTRACT

The invention relates to the technical field of lithium battery slurry materials, in particular to a conductive carbon material dispersing agent which comprises one of modified polyvinyl alcohol, alkyl ammonium salt copolymer, olefin block maleic anhydride copolymer and pyrrolidone copolymer, or mixtures thereof, and can effectively disperse carbon nanotube, graphene and other conductive carbon materials in a solvent to obtain uniform conductive slurry; further disclosed is a high-conductivity slurry for the lithium battery, which comprises 0.5-15.0% by weight of a conductive carbon material and 0.1-3.0% by weight of a dispersing agent, and can remarkably reduce the bulk resistivity of a positive electrode system of the lithium battery and improve the conductivity of a pole piece.

6 Claims, 3 Drawing Sheets

(51) Int. Cl.
*H01M 4/133* (2010.01)
*H01M 4/04* (2006.01)

(56) References Cited

U.S. PATENT DOCUMENTS

| | | | | |
|---|---|---|---|---|
| 2015/0353780 | A1* | 12/2015 | Yoshida | H01M 4/667 |
| | | | | 252/511 |
| 2016/0200850 | A1* | 7/2016 | Hatanaka | H01B 1/24 |
| | | | | 429/245 |
| 2016/0332469 | A1* | 11/2016 | Morita | B41M 5/30 |
| 2020/0131379 | A1* | 4/2020 | Himizu | C08K 5/3492 |

OTHER PUBLICATIONS

Jing Zhang et al., Research Progress in Polyvinyl Alcohol Modification, China Synthetic Fiber Industry, Feb. 2005, pp. 57-60, vol. 28, No. 1.

Xiao-Hua Li et al., Polymer of Styrene—maleic anhydride and its Application Evolvement, Leather Science and Engineering, Apr. 2009, pp. 42-46, vol. 19, No. 2.

Jun Tian, Study on the Copolymer of Vinyl Ether and Maleic Anhydride, China Academic Journal Electronic Publishing House, 2008, pp. 1-64.

* cited by examiner

CONDUCTIVE CARBON MATERIAL DISPERSING AGENT AND HIGH-CONDUCTIVITY SLURRY FOR LITHIUM BATTERY

CROSS-REFERENCE TO RELATED APPLICATION

This application claims priority to and benefits of U.S. provisional patent application No. 62/737,934 filed on Sep. 28, 2018, the entire content of which is incorporated herein by reference.

TECHNICAL FIELD

The invention relates to the technical field of lithium battery slurry materials, in particular to a conductive carbon material dispersing agent and a high-conductivity slurry for a lithium battery.

BACKGROUND ART

The lithium ion battery conductive slurry is mainly carbon-based conductive slurry and comprises conductive carbon black, conductive graphite, carbon nanotube, graphene and mixture thereof. In general, carbon black and graphite are commonly referred to as conventional conductive slurry, and carbon nanotube, graphene and mixture thereof are referred to as novel conductive slurry.

The carbon nanotube, having very good electrical conductivity and an extremely high length-diameter ratio, can effectively form a three-dimensional conductive network when added into the positive and negative electrode materials of a lithium ion battery, thereby improving the electrical conductivity of the positive and negative electrode pole pieces, enabling the lithium ion battery to show excellent performance, specifically characterized by large battery capacity and long cycle life and thus suitable for batteries of high-end digital products and new energy automobiles. Because the diameter of the carbon nanotube is at nanometer scale, and the carbon nanotube exists in the form of yarn balls, which may cause difficulties in dispersing during slurry mixing, and consequently renders poor performance of the lithium battery.

Graphene is a new member of carbon materials, which is a single-layer sheet-like structure composed of carbon atoms in sp2 hybrid orbitals with only one atomic layer thickness. Because of this unique two-dimensional structure, graphene possesses a series of excellent physicochemical properties, such as high mechanical strength, ultra-high thermal conductivity, and extremely large specific surface area. However, the Van der Waals' force between graphene sheets is strong, and is likely to cause re-stacking of graphene sheets, resulting in a great challenge in graphene preparation and stability maintenance.

Carbon nanotube, graphene, carbon black and other conductive carbon materials, because of their good electrical conductivity, have been commercialized as lithium battery positive electrode conductive additives in lithium battery systems. However, the properties of the carbon nanotube or graphene conductive slurry available in the market are different, which leads to obvious differences in the application in a lithium battery system, and the dispersing agent serves as a major component in the preparation of the conductive slurry, whose dispersing effect can obviously affect the performance of the conductive carbon in the positive electrode of the lithium battery. The applicant previously filed an invention patent application No. 201610524793.6, wherein polyvinyl pyrrolidone or polyvinyl alcohol is used as a dispersing agent and is mixed with the carbon nanotube to prepare conductive slurry. However, when the specific surface area of the conductive carbon material is large, the required dispersing agent dosage increases. In the market, high proportion of typical dispersing agents causes an increased resistivity of the formed pole piece, reduces the conductivity of the pole piece, and finally affects the performance of the product in a lithium battery system. Therefore, the selection and dosage of dispersing agents are especially critical in the preparation of conductive slurry.

SUMMARY OF THE INVENTION

To address the defects in the prior art, it's an object of the invention to provide a conductive carbon material dispersing agent which can effectively disperse carbon nanotube, graphene and other conductive carbon materials in a solvent to obtain uniform conductive slurry.

It's another object of the invention to provide a high-conductivity slurry for a lithium battery, which is applied to a lithium ion battery and can remarkably reduce the bulk resistivity of a positive electrode system of the lithium battery, thereby improving the conductivity of a pole piece.

The above objects of the invention are achieved through the following technical scheme:

A conductive carbon material dispersing agent, comprising one of modified polyvinyl alcohol, alkylammonium salt copolymer and olefin block maleic anhydride copolymer, or mixtures thereof.

The novel conductive carbon material has a large surface attraction force, such as Van der Waals' force between molecules, as a result, the conductive carbon material is agglomerated or stacked, hindering the conductive carbon material from constructing a three-dimensional structure network in a lithium battery positive electrode system, and hence affecting the mechanical strength and the conductive performance of a pole piece. During slurry preparation, an appropriate dispersing agent is used for effectively dispersing the conductive material to improve the applicability of the conductive material. As an effective dispersing agent, it is supposed to have good affinity with both the dispersoid (e.g., conductive carbon material) and the dispersion medium (e.g., N-methylpyrrolidone, NMP). In the dispersion medium, according to the characteristics of the dispersoid, an appropriate amount is selected, a head end (such as polyolefin and alkane chains, benzene ring and other structures) having good affinity with the dispersoid in a dispersing agent structure is attached to the surface of the dispersoid, and a tail end (oxygen-containing and nitrogen-containing groups or ring structures such as epoxy, carboxyl, maleic anhydride and the like) having affinity with the dispersion medium forms a distribution with a certain density on the surface of the dispersoid and extends towards the dispersoid, causing a high steric hindrance effect or electrostatic repulsion, so that collision and agglomeration among conductive carbon material particles are avoided. And the tail end with better affinity with the dispersion medium enables the conductive carbon material to be better infiltrated by the solvent, so that the conductive carbon material is easier to disperse in the solvent.

It should also be noted that typical dispersing agents, such as polyvinylpyrrolidone, form a non-benign conductive layer with a certain density on the surface of the dispersion, which somewhat weakens the conductivity of the conductive carbon material in the positive electrode system of lithium batteries. A high proportion of this dispersing agent in conductive slurry will surely greatly affect the superiority of the conductive carbon material in lithium batteries.

The dispersing agent disclosed by the present invention addresses the above problem of the typical dispersing agent, and the lithium battery conductive slurry prepared by mixing one of modified polyvinyl alcohol, alkyl ammonium salt copolymer and olefin block maleic anhydride copolymer or mixtures thereof with a conductive carbon material can effectively disperse the conductive carbon material; moreover, when the above lithium battery conductive slurry applied to a lithium battery positive electrode system, the bulk resistivity of the obtained conductive slurry is reduced, and the conductivity of a pole piece is improved.

Furthermore, the conductive slurry dispersing agent of the present invention further comprises one of polyethylene glycol, polyvinylpyrrolidone, and polyvinylidene fluoride, or mixtures thereof.

According to the invention, on the basis of one of modified polyvinyl alcohol, alkyl ammonium salt copolymer and olefin block maleic anhydride copolymer or mixtures thereof, some typical dispersing agents in the prior art, such as one of polyethylene glycol, polyvinylpyrrolidone and polyvinylidene fluoride or mixtures thereof, can be added for use in combination, and the obtained conductive slurry can be reasonably selective and adapted to different conductive carbon materials. For example, when carbon nanotubes are used as the conductive carbon material, the dispersing agent may select to use one of modified polyvinyl alcohol, alkylammonium salt copolymer, and olefin block maleic anhydride copolymer independently or mixtures thereof; while when graphene is used as the conductive carbon material, it is preferable to compound and add one of polyethylene glycol, polyvinylpyrrolidone, and polyvinylidene fluoride or a mixture if some of them for use in combination, which has a more remarkable and stable effect of reducing the pole piece resistivity.

Specifically, the modified polyvinyl alcohol is epoxy-modified polyvinyl alcohol, carboxyl-modified polyvinyl alcohol, polyvinyl alcohol-maleic anhydride crosslinked polymer and polyvinyl acetal glue modified from aldehyde acetals such as formaldehyde, acetaldehyde, glyoxal, butyraldehyde and the like.

Epoxidation, carboxylation, maleic anhydride and acetalization are employed for the purpose of increasing the affinity of the modified polyvinyl alcohol with the dispersion medium (e.g., NMP) and facilitating the dispersion of the dispersoid. For the synthesis of dispersing agents, reference is made to published Document 1 (Zhang Jing, Tu Weiping, Xia Zhengbin, *Research Progress in Polyvinyl Alcohol Modification* [J]. *Synthetic Fiber Industry,* 2005, 28(1):57-60) and Document 2 (Yang Zhenggen, Liu Lianying, Yu Meng, et al. *Study on Mechanism of PVA Activated Modified Maleic Anhydride Copolymer* [J]. *Journal of Beijing University of Chemical Technology (Natural Science Edition),* 2009, 36(6):72-76).

Specifically, the alkylammonium salt copolymer is BYK-9076 and BYK-9077 of BYK Chemie, MOK®-5022 of Merck, German, and analogous alkylammonium salt copolymer thereof in the market. Polystyrene maleic anhydride co-ammonium salt can be commercially available such as SMA-NH4 from Cray Valley, France, or other commercially available products of the same type.

Specifically, the olefin block maleic anhydride copolymer includes a styrene maleic anhydride copolymer, a polyethylene-maleic anhydride copolymer, an isobutylene-maleic anhydride copolymer, an alkyl vinyl ether-maleic anhydride copolymer, or an acrylic acid-maleic anhydride copolymer.

The above dispersing agents can be synthesized by the methods in the prior publications, or commercially available.

The carbon nanotube, the graphene and the compound product with other conductive carbon materials are used as novel conductive materials of lithium battery slurry and have very excellent conductive performance, and in combination with the dispersing agent disclosed by the present invention, the bulk resistivity of the conductive slurry at the positive electrode of the lithium battery can be reduced while conductive carbon materials are effectively dispersed, and the conductivity of the pole piece is improved.

A preparation method of high-conductivity conductive slurry, specifically comprising the steps of:

1) drying a conductive carbon material and the dispersing agent to a constant weight, and removing water;

2) adding a solvent into a pre-dispersion tank, then adding a corresponding dispersing agent, adding the conductive carbon material after the dispersing agent is fully dissolved in the solvent, and performing preliminary dispersion and premixing of the materials to obtain a preliminary premixed slurry; and 3) transferring the pre-dispersed slurry into a dispersing device, proceeding with the dispersing and preparation, discharging and collecting after various parameters such as particle size, solid content and the like are qualified to obtain a finished product of the high-conductivity conductive slurry.

A high-conductivity conductive slurry, comprising the above dispersing agent, and further comprising a conductive carbon material and a solvent, wherein a proportion of the conductive carbon material is 0.5-15.0% by weight, a proportion of the dispersing agent is 0.1-3.0% by weight, and the rest is the solvent.

Specifically, the conductive carbon material comprises one of single-walled or multi-walled carbon nanotube, graphene, and carbon black-based conductive material, or mixtures thereof.

The solvent is one of N-methylpyrrolidone, methanol, ethanol, isopropanol and water, or mixtures thereof. The above-mentioned solvents are typical solvents in the art and are not described in detail herein.

The dispersing method is mainly one or more of mechanical stirring, sanding dispersing and ultrasonic dispersing.

The dispersing device adopted can be a high-speed stirring tank, a ball mill, a sand mill, an ultrasonic device, a homogenizer, a colloid mill and the like.

In summary, the invention has the following beneficial effects:

firstly, upon specific selection, the dispersing agent disclosed by the invention can effectively disperse the conductive carbon material when used for the first time in the preparation process of the conductive slurry; moreover, the dispersing agent also has an excellent effect when compounded and used together with typical dispersing agents in the market;

secondly, compared with typical similar products in the market, the high-conductivity slurry provided by the invention is simple in component and used as a conductive additive in a lithium battery positive electrode system, hence the conductivity of the pole piece is remarkably improved, and the performance of the lithium battery can be improved.

DETAILED DESCRIPTION OF THE INVENTION

The present invention will now be described in detail with reference to the accompanying drawings and examples.

EXAMPLE 1

In this example, 12 g carbon nanotube was taken as the conductive carbon material, 6 g styrene-maleic anhydride copolymer was taken, whose synthesis method can be learned with reference to Document 3 (Li Xiaohua, Qiang Xihuai, Hong Xinqiu. *Styrene-maleic Anhydride Copolymer and Application* [J]. *Leather Science and Engineering*, 2009, 19(2):42-46), and 384 g N-methylpyrrolidone was taken as the solvent. Firstly, the styrene maleic anhydride copolymer was pre-dissloved in the N-methyl pyrrolidone, then the carbon nanotube was added, mechanical stirring and pre-dispersing were carried out for 10 min, and sanding and dispersing were carried out further for 1.5 h to obtain a carbon nanotube conductive slurry A1.

EXAMPLE 2

In this example, 14 g of carbon nanotube was taken as the conductive carbon material, 7 g polyvinyl formal was taken, and 379 g N-methyl pyrrolidone (NMP) was taken as the solvent. The dispersing agent was pre-dissolved in NMP, then the conductive carbon material was added, mechanical stirring and pre-dispersing was carried out for 10 min, and sanding and dispersing were carried out further for 1.5 h to obtain a carbon nanotube conductive slurry A2.

EXAMPLE 3

In this example, 2.0 g carbon nanotube material was taken as the conductive carbon material, 0.4 g BYK Chemie BYK-9076 was taken, and 397.6 g pure water was taken as the solvent. The dispersing agent was pre-dissolved in pure water, then the conductive carbon material was added, mechanical stirring and pre-dispersing was carried out for 10 min, and sanding and dispersing were carried out further for 1.5 h to obtain a carbon nanotube conductive slurry A3.

EXAMPLE 4

In this example, 14 g carbon nanotube was taken as the conductive carbon material, 3.0 g polyvinyl butyral was taken, 4.0 g German Merck MOK®-502 was taken, and 379 g NMP was taken as the solvent. The dispersing agents were pre-dissolved in NMP, then the conductive carbon material was added, mechanical stirring and pre-dispersing was carried out for 10 min, and sanding and dispersing were carried out further for 1.5 h to obtain a carbon nanotube conductive slurry A4.

EXAMPLE 5

In this example, 14 g carbon nanotube was taken as the conductive carbon material, 3.0 g polyvinyl acetal was taken, 4.0 g polyvinyl pyrrolidone was taken, and 379 g ethanol was taken as the solvent. The dispersing agents were firstly pre-dissolved in ethanol, then the conductive carbon material was added, mechanical stirring and pre-dispersing was carried out for 10 min, and ultrasonic dispersing was carried out further for 1.5 h to obtain a carbon nanotube conductive slurry A5.

EXAMPLE 6

In this example, 2 g graphene material was taken as the conductive carbon material, 2.4 g polyvinylidene fluoride was taken, 1.6 g alkyl vinyl ether-maleic anhydride copolymer was taken, whose preparation method can be learned with reference to Document 4 (Tianjun, *Research on Vinyl Ether-Maleic Anhydride Copolymer* [D]. Graduate University of Chinese Academy of Sciences (Institute of Physical and Chemical Technology), 2008), and 380 g NMP was taken as the solvent. The dispersing agents were pre-dissolved in NMP, then the conductive carbon material was added, mechanical stirring and pre-dispersing was carried out for 10 min, and sanding and dispersing were carried out further for 1.5 h to obtain a graphene conductive slurry B1.

EXAMPLE 7

In this example, 20 g of graphene material was taken as the conductive carbon material, 5.0 g polyvinyl butyral was taken, and 375 g isopropyl alcohol was taken as the solvent.

The dispersing agent d was pre-dissolved in isopropanol, then the conductive carbon material was added, mechanical stirring and pre-dispersing was carried out for 10 min, and sanding and dispersing were carried out further for 1.5 h to obtain a graphene conductive slurry B2.

EXAMPLE 8

In this example, 16 g graphene material was taken as the conductive carbon material, 2.0 g polyvinylidene fluoride was taken, 0.5 g polyethylene glycol was taken, 1.5 g carboxyl modified polyvinyl alcohol was taken, and 380 g NMP was taken as the solvent. The dispersing agents were pre-dissolved in NMP, then the conductive carbon material was added, material was added, mechanical stirring and pre-dispersing was carried out for 10 min, and ultrasonic dispersing were carried out further for 1.0 h to obtain a graphene conductive slurry B3.

EXAMPLE 9

In this example, 8 g carbon nanotube and 8 g graphene material were taken as the conductive carbon material, 2.0 g olefin block maleic anhydride was taken, whose preparation method can be learned with reference to Document 5 (ADUR ASHOK M; TARANEKAR PRASAD. *Olefin-Maleic Anhydride Copolymer Compositions and Uses Thereof*: CN 104736643 A [P]. 2015), 2.0 g polyvinylidene fluoride was taken, and 380 g NMP was taken as the solvent. The dispersing agents were pre-dissolved in NMP, then the conductive carbon material was added, mechanical stirring and pre-dispersing was carried out for 10 min, and sanding and dispersing were carried out further for 1.5 h to obtain a carbon nanotube/graphene composite conductive slurry C1.

EXAMPLE 10

In this example, 8 g carbon nanotube and 8 g graphene material were taken as the conductive carbon materials, 0.8 g polyvinylpyrrolidone was taken, 1.2 g epoxy-modified polyvinyl alcohol was taken, 2.0 g polyvinylidene fluoride was taken, and 380 g NMP was taken as the solvent. The dispersing agents were pre-dissolved in NMP, then the conductive carbon materials were added, mechanical stirring and pre-dispersing was carried out for 10 min, and sanding and dispersing were carried out further for 1.5 h to obtain a carbon nanotube/graphene composite conductive slurry C2.

EXAMPLE 11

In this example, 6.0 g carbon nanotube and 54.0 g conductive carbon black were taken as the conductive carbon materials, 6.0 g polyvinylpyrrolidone was taken, 6.0 g polyvinyl alcohol-maleic anhydride crosslinked polymer was taken, and 328 g NMP was taken as the solvent. The dispersing agents were pre-dissolved in NMP, then the conductive carbon materials were added, mechanical stirring and pre-dispersing was carried out for 10 min, and sanding and dispersing were carried out further for 1.5 h to obtain a carbon nanotube/conductive carbon black composite conductive slurry D1.

COMPARATIVE EXAMPLE 1

In this example, 12 g carbon nanotube was taken as the conductive carbon material, 8 g dispersing agent was taken, and 380 g NMP was taken as the solvent. Polyvinylpyrrolidone was taken as the dispersing agent and pre-dissolved in NMP, then the conductive carbon material was added, mechanical stirring and pre-dispersing was carried out for 10 min, and sanding and dispersing were carried out further for 1.5 h to obtain a carbon nanotube conductive slurry A0.

COMPARATIVE EXAMPLE 2

In this example, 16 g graphene material was taken as the conductive carbon material, 4 g dispersing agent was taken, and 380 g NMP was taken as the solvent. Polyvinylidene fluoride was taken as the dispersing agent and pre-dissolved in NMP, then the conductive carbon materials were added, mechanical stirring and pre-dispersing was carried out for 10 min, and sanding and dispersing were carried out further for 1.5 h to obtain a graphene conductive slurry B0.

COMPARATIVE EXAMPLE 3

In this example, 8 g carbon nanotube and 8 g graphene material were taken as the conductive carbon materials, 4 g dispersing agent was taken, and 380 g NMP was taken as the solvent. 2.0 g polyvinylpyrrolidone and 2.0 g polyvinylidene fluoride were taken as the dispersing agents and were pre-dissolved in NMP, the conductive carbon materials were added, mechanical stirring and pre-dispersing was carried out for 10 min, and sanding and dispersing were carried out further for 1.5 h to obtain a carbon nanotube/graphene composite conductive slurry C0.

COMPARATIVE EXAMPLE 4

In this example, 6.0 g carbon nanotube and 54.0 g of conductive carbon black were taken as the conductive carbon materials, 12.0 g polyvinylpyrrolidone was taken, and 328 g NMP was taken as the solvent. The dispersing agent was pre-dissolved in NMP, then the conductive carbon materials were added, mechanical stirring and pre-dispersing was carried out for 10 min, and sanding and dispersing were carried out further for 1.5 h to obtain a carbon nanotube/conductive carbon black composite conductive slurry D0.

In order to further verify the application situation of the conductive slurry in the lithium battery, the positive electrode mixed slurry of the lithium ion battery with different positive electrode main material systems was prepared and coated on a PET film, after being dried at high temperature, the bulk resistivity of the pole piece was tested by a four-probe method, and the difference of the conductivity of the pole piece under different formulas was obtained. The process specifically includes:

1) dissolving a typical lithium battery adhesive in a solvent, adding an appropriate amount of the conductive slurry in the above-mentioned Examples 1-10 and Comparative Examples 1-4 according to a conventional formula, and stirring and mixing at a low speed to obtain a mixed slurry;

2) adding a positive electrode active material (taking a nickel-cobalt-manganese ternary material NCM or a lithium iron phosphate material LFP as an example) into the mixed slurry, and uniformly dispersing at a high speed to obtain a positive electrode slurry;

3) coating the obtained positive electrode slurry on a polyethylene terephthalate (PET) film by using an automatic film coating machine with a 200 um scraper, and then drying at high temperature to obtain a positive electrode pole piece; and 4) cutting the pole piece by using a wafer punching machine, compacting by using a pressing machine, testing the bulk resistivity of the pole piece by using a four-probe tester, testing two pieces to obtain of six groups of data, and averaging.

The exemplary NCM and LFP positive electrode system formulas in bulk resistivity testing are recommended formulas in downstream market applications, specifically as follows in Table 1:

TABLE 1

| LFP | Conductive carbon material | PVDF (Polyvinylidene fluoride) | Slurries of the Examples are applicable |
|---|---|---|---|
| 95.25% | 1.00% | 3.50% | All the slurries |
| NCM | Conductive carbon material | PVDF (Polyvinylidene fluoride) | Slurries of all the Examples of the present invention are applicable |
| 98.50% | 0.40% | 1.00% | A0-A5 |
| 98.06% | 0.75% | 1.00% | B0-B3, C0-C2, D0-D1 |

The bulk resistivities of the above Examples 1-11 were as follows in Table 2 and Table 3:

TABLE 2

| Positive electrode material | Types | Carbon nanotube (CNT) conductive slurry | | | | | Graphene (GRN) conductive slurry | | |
|---|---|---|---|---|---|---|---|---|---|
| | | A1 | A2 | A3 | A4 | A5 | B1 | B2 | B3 |
| LFP | Dosage | 1.0% | 1.0% | 1.0% | 1.0% | 1.0% | 1.0% | 1.0% | 1.0% |
| | Bulk resistivity | 14.84 | 7.42 | 13.24 | 11.56 | 10.25 | 20.75 | 17.68 | 20.54 |

TABLE 2-continued

| Positive electrode material | Types | Carbon nanotube (CNT) conductive slurry | | | | | Graphene (GRN) conductive slurry | | |
|---|---|---|---|---|---|---|---|---|---|
| | | A1 | A2 | A3 | A4 | A5 | B1 | B2 | B3 |
| NCM | Dosage | 0.4% | 0.4% | 0.4% | 0.4% | 0.4% | 0.75% | 0.75% | 0.75% |
| | Bulk resistivity | 16.64 | 13.21 | 15.48 | 10.18 | 15.28 | 25.62 | 19.72 | 23.22 |

TABLE 3

| Positive electrode material | Types | CNT/GRN compound slurry | | Carbon nanotube/ carbon black compound slurry |
|---|---|---|---|---|
| | | C1 | C2 | D1 |
| LFP | Dosage | 1.0% | 1.0% | 1.0% |
| | Bulk resistivity | 13.52 | 8.85 | 54.72 |
| NCM | Dosage | 0.75% | 0.75% | 0.75% |
| | Bulk resistivity | 13.28 | 12.42 | 164.56 |

The bulk resistivities of the corresponding Comparative Examples 1-4 were shown in Table 4 below:

TABLE 4

| Positive electrode material | Types | A0 | B0 | C0 | D0 |
|---|---|---|---|---|---|
| LFP | Dosage | 1.0% | 1.0% | 1.0% | 1.0% |
| | Bulk resistivity | 22.62 | 30.82 | 21.26 | 80.34 |
| NCM | Dosage | 0.4% | 0.75% | 0.75% | 0.75% |
| | Bulk resistivity | 22.75 | 32.48 | 20.71 | 216.4 |

It can be learned from the data in the above tables that:

compared with the carbon nanotube conductive slurry AO in Comparative Example 1, the bulk resistivities of A1-A4 in Examples 1-4 were reduced by 34.39%, 67.20%, 41.47% and 48.90% in the LFP system and by 26.86%, 41.93%, 31.96% and 55.25% in the NCM system, respectively. The conductivity data proved that: with the same carbon nanotube material, the dispersing agent provided by the present invention plays a key role in the performance of the conductive slurry prepared by sanding; when the product is used for a lithium battery positive electrode system, the positive electrode pole piece prepared by using the dispersing agent provided by the present invention has superior conductivity. As for the slurry A5 prepared in Example 5 by ultrasonic sanding, the bulk resistivity was also reduced by 54.69% and 22.08% in the NCM and LFP systems, respectively, which indicates that the dispersing agent of the present invention also has an excellent effect on the ultrasonic dispersion slurry preparation process.

Compared with the graphene conductive slurry BO in Comparative Example 2, the bulk resistivities of B 1-B2 in Examples 5-7 were reduced by 32.67%, 42.63% and 33.35% in the LFP system and by 21.12% and 39.29% in the NCM system, respectively. The conductivity data proved that: with the same graphene material, the dispersing agent disclosed by the present invention plays a key role in the performance of the conductive slurry prepared by sanding; when the product is used for a lithium battery positive electrode system, the positive electrode pole piece prepared by using the dispersing agent disclosed by the invention has superior conductivity. As for the slurry B3 prepared in Example 8 by ultrasonic sanding, the bulk resistivity was also reduced by 30.15% and 36.76% in the NCM and LFP systems, respectively, which indicates that the novel dispersing agent also had excellent effect on the ultrasonic dispersion slurry preparation process.

Compared with the carbon nanotube and graphene composite conductive slurry CO in Comparative Example 3, the bulk resistivities of C1-C2 in Examples 9-10 were reduced by 36.41% and 58.37% in the LFP system and by 35.88% and 40.03% in the NCM system, respectively. The conductivity data proved that: with the same carbon material, the dispersing agent of the present invention plays a key role in the performance of the conductive slurry prepared by sanding; when the product is used for a lithium battery positive electrode system, the positive electrode pole piece prepared by using the dispersing agent of the present invention has superior conductivity.

Compared with the carbon nanotube and graphene compounded conductive slurry DO in Comparative Example 4, the bulk resistivity of the slurry D1 in Example 11 was reduced by 31.89% and 31.50% in the LFP and NCM systems respectively. The conductivity data proved that: with the same carbon material, the dispersing agent of the present invention plays a key role in the performance of the conductive slurry prepared by sanding; when the product is used for a lithium battery positive electrode system, the positive pole piece prepared by using the dispersing agent disclosed by the present invention has superior conductivity.

In summary of the above Examples, the application of the novel conductive slurry as a conductive additive in a positive electrode system of a lithium battery shows a remarkable gain effect on reducing the pole piece bulk resistivity, and also proves the superiority of the high-conductivity conductive slurry prepared according to the dispersing agent formula in the Examples.

Figure 1:
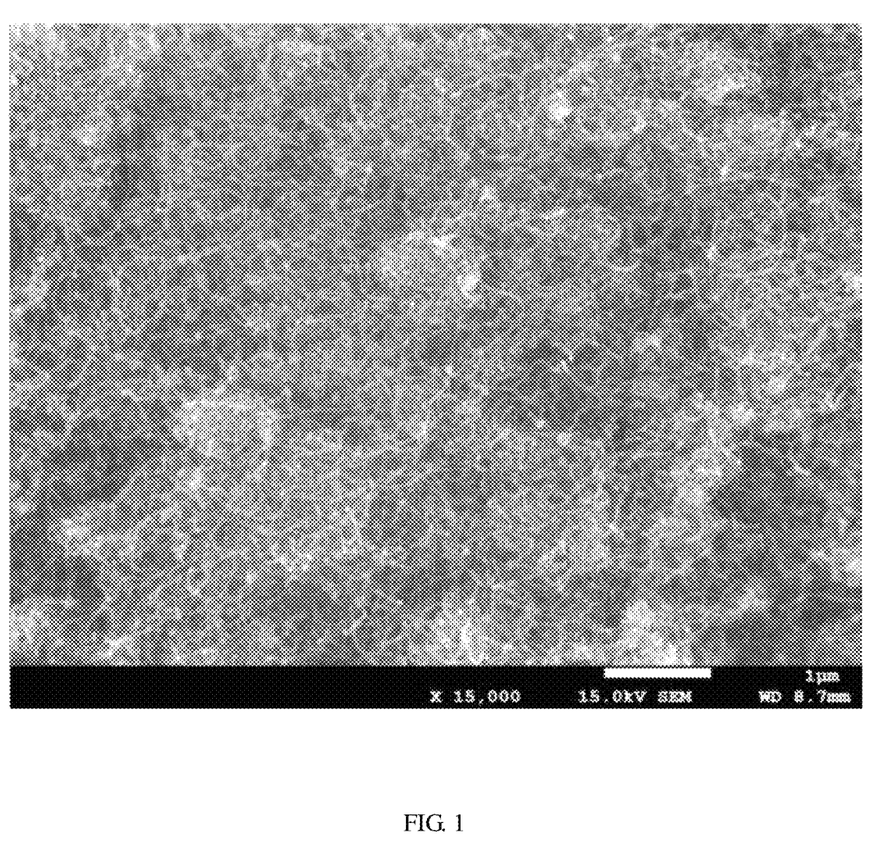
FIG. 1 shows the morphology of the conductive slurry in Example 2 through SEM.
Figure 2:
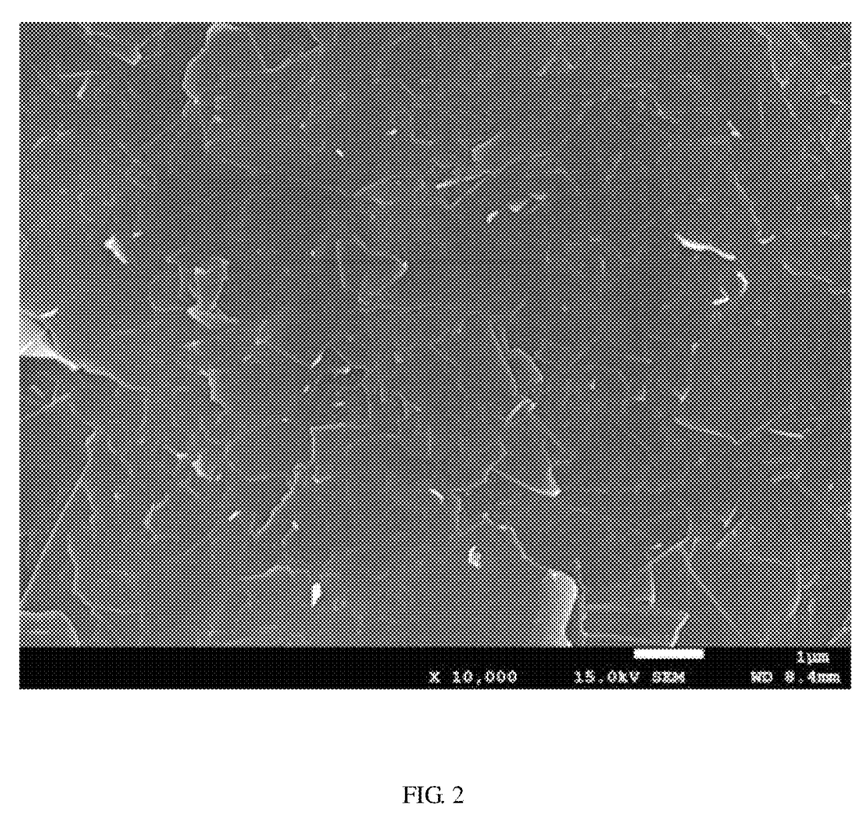
FIG. 2 shows the morphology of the conductive slurry in Example 6 through SEM.
Figure 3:
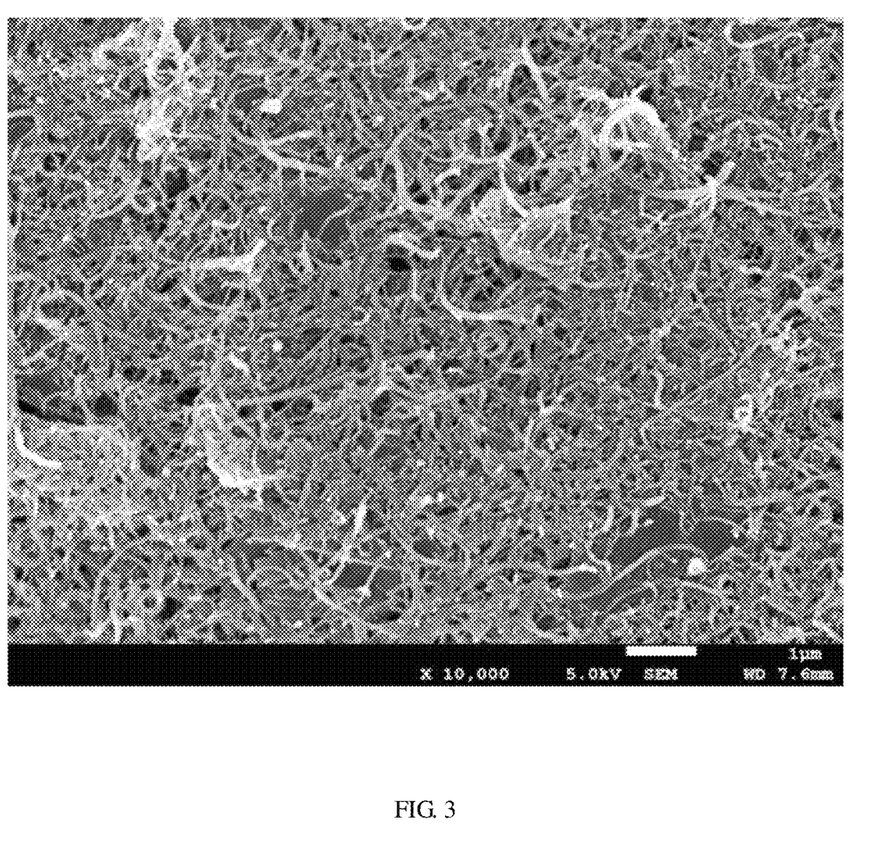
FIG. 3 shows the morphology of the conductive slurry in Example 9 through SEM.

As can be seen from the scanning electron micrographs (SEM) of FIGS. 1-3, the conductive slurry prepared in the above Examples was well dispersed and the conductive carbon materials were well dispersed from each other without significant agglomeration. When applied to a positive electrode system, the conductive carbon material can be uniformly coated on the surface of the positive electrode main material, an advance three-dimensional conductive network can be effectively constructed after the pole piece is compacted, so that the conductive performance of the positive electrode main material originally with poor conductivity can be remarkably enhanced, and the overall performance of the lithium battery is improved. In addition, it is noteworthy that the internal resistance of the lithium battery, which is caused by different factors including but not limited to the conductivity of the positive pole piece, cannot be equal to the resistivity of the positive pole piece, but an improved conductivity of the positive pole piece is beneficial to reducing the internal resistance of the lithium battery.

It is to be noted that the above-mentioned Examples are only those mentioned, the dispersing agent still has a gain effect on carbon material conductive slurry prepared separately or in combination with other carbon materials such as carbon black, and the excellent effect exhibited by the conductive slurry is not limited to the application in the above-mentioned NCM/LFP positive electrode system, but should include the lithium cobaltate (LCO) system and other positive electrode systems.

The above-mentioned examples are merely preferred embodiments of the present invention, and the scope of the present invention is not limited to the above-mentioned embodiments, and all technical solutions falling within the spirit of the present invention fall within the scope of the present invention. It should be noted that those skilled in the art will appreciate that various modifications and adaptations can be made without departing from the spirit and scope of the present invention.

The invention claimed is:

1. A conductive carbon material dispersing agent, comprising modified polyvinyl alcohol, alkylammonium salt copolymer and acrylic acid-maleic anhydride copolymer, wherein the modified polyvinyl alcohol is polyvinyl alcohol-maleic anhydride crosslinked polymer.

2. The conductive carbon material dispersing agent according to claim 1, further comprising one selected from a group consisting of polyethylene glycol, polyvinylpyrrolidone, polyvinylidene fluoride, and mixtures thereof.

3. The conductive carbon material dispersing agent according to claim 1, wherein the alkylammonium salt copolymer is selected from a group consisting of BYK-9076 and BYK-9077 of BYK Chemie, MOK®-5022 of Merck, German, and analogous alkylammonium salt copolymer thereof in the market.

4. A high-conductivity slurry for a lithium battery, comprising the conductive carbon material dispersing agent according to claim 1, and further comprising a conductive carbon material and a solvent, wherein a proportion of the conductive carbon material in the high-conductive slurry is 0.5-15.0% by weight, a proportion of the conductive carbon material dispersing agent in the high-conductive slurry is 0.1-3.0% by weight, and the rest is the solvent.

5. The high-conductivity slurry for a lithium battery according to claim 4, wherein the conductive carbon material comprises one selected from a group consisting of single-walled carbon nanotube, multi-walled carbon nanotube, graphene, carbon black-based conductive material, and mixtures thereof.

6. The high-conductivity slurry for a lithium battery according to claim 4, wherein the solvent is one selected from a group consisting of N-methylpyrrolidone, methanol, ethanol, isopropanol, water, and mixtures thereof.

* * * * *